und States Patent (12) United States Patent
Ayuzawa et al.

(10) Patent No.: US 10,288,097 B2
(45) Date of Patent: May 14, 2019

(54) FIBER-REINFORCED RESIN MEMBER AND METHOD FOR PRODUCING FIBER-REINFORCED RESIN MEMBER (71) Applicant: HONDA MOTOR CO., LTD., Minato-ku, Tokyo (JP)

(72) Inventors: Shotaro Ayuzawa, Wako (JP); Yoshikatsu Ohta, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 290 days.

(21) Appl. No.: 15/501,542

(22) PCT Filed: May 12, 2015

(86) PCT No.: PCT/JP2015/063580
§ 371 (c)(1),
(2) Date: Feb. 3, 2017

(87) PCT Pub. No.: WO2016/021259
PCT Pub. Date: Feb. 11, 2016

(65) Prior Publication Data
US 2017/0234342 A1    Aug. 17, 2017

(30) Foreign Application Priority Data
Aug. 6, 2014   (JP) ................................. 2014-160145

(51) Int. Cl.
F16B 5/02      (2006.01)
B29C 70/06     (2006.01)
(Continued)

(52) U.S. Cl.
CPC ............... F16B 5/02 (2013.01); B29C 70/06 (2013.01); B29C 70/34 (2013.01); B29C 70/545 (2013.01);
(Continued)

(58) Field of Classification Search
CPC .......... B29C 70/06; B29C 43/02; B32B 3/26; B32B 3/266; B32B 37/02; B32B 5/26; F16B 5/02; F16B 5/0258; F16B 43/001
See application file for complete search history.

(56) References Cited

U.S. PATENT DOCUMENTS

2007/0234544 A1* 10/2007 Bogue ..................... B23P 6/002
                                                29/402.01
2009/0208691 A1*  8/2009 Whitworth ................ B23P 6/00
                                                   428/63
(Continued)

FOREIGN PATENT DOCUMENTS

JP      2004-108497 A    4/2004
JP      2009-204159 A    9/2009
(Continued)

Primary Examiner — Jonathan P Masinick
(74) Attorney, Agent, or Firm — Carrier Blackman & Associates, P.C.; Joseph P. Carrier; Fulchand P. Shende (57) ABSTRACT A fiber-reinforced resin member is provided in which a non-conductive sleeve and first and second non-conductive sheets are disposed between a metal fastening member and CFRP laminate, electrical continuity between the metal fastening member and the CFRP laminate is cut off, and corrosion of the metal fastening member due to galvanic corrosion is prevented. A first annular space is formed between a first flange portion of a first member and the first non-conductive sheet, a second annular space is formed between a second flange portion of a second member and the second non-conductive sheet. Therefore, even if frayed carbon fiber sticks out from a gap between the non-conductive sleeve and the first and second non-conductive sheets, due to the first and second annular spaces being formed therein, it is possible to prevent the sticking-out carbon fiber from contacting the first and second members and providing electrical continuity.

10 Claims, 5 Drawing Sheets (51) Int. Cl.
*F16B 43/00* (2006.01)
*B29C 70/68* (2006.01)
*B29C 70/34* (2006.01)
*B29C 70/54* (2006.01)
*F16B 33/00* (2006.01)
*B29K 105/08* (2006.01)
*B29K 307/04* (2006.01)
*F16B 11/00* (2006.01)

(52) U.S. Cl.
CPC ............ *B29C 70/68* (2013.01); *F16B 33/008* (2013.01); *F16B 43/00* (2013.01); *B29K 2105/0872* (2013.01); *B29K 2307/04* (2013.01); *B29K 2995/0007* (2013.01); *F16B 11/006* (2013.01); *F16B 43/001* (2013.01)

(56) References Cited

U.S. PATENT DOCUMENTS

| | | | | |
|---|---|---|---|---|
| 2012/0272637 | A1* | 11/2012 | Holland | B29C 63/34 60/226.2 |
| 2013/0025770 | A1* | 1/2013 | Shigetomi | B29C 73/06 156/98 |
| 2014/0212624 | A1 | 7/2014 | Ayuzawa | |
| 2017/0361875 | A1* | 12/2017 | Ayuzawa | B62D 21/15 |

FOREIGN PATENT DOCUMENTS

| | | |
|---|---|---|
| JP | 3155761 U | 12/2009 |
| WO | 2013/031360 A1 | 3/2013 |

* cited by examiner

FIBER-REINFORCED RESIN MEMBER AND METHOD FOR PRODUCING FIBER-REINFORCED RESIN MEMBER

TECHNICAL FIELD

The present invention relates to a fiber-reinforced resin member in which a through hole is machined in a CFRP laminate having a carbon fiber embedded in a resin and a conductive metal fastening member is mounted in the through hole in an electrically insulated state, and a method for producing the fiber-reinforced resin member.

BACKGROUND ART

When a component is directly fastened to a CFRP (carbon fiber-reinforced plastic) laminate by means of a bolt, stress is concentrated in the CFRP laminate in the vicinity of the fastened part, and there is a possibility that the resin will break and the strength with which the component is fastened will be degraded. The strength with which a component is fastened can be enhanced by mounting a metal fastening member in a through hole formed in the CFRP laminate and fastening the component to the metal fastening member by means of a bolt, thus preventing the stress from being concentrated in the CFRP laminate.

However, with the above arrangement, since the CFRP laminate, which is conductive, and the metal fastening member, which is conductive, are in direct contact and are electrically continuous, there is the problem that the metal fastening member will be corroded by the galvanic corrosion effect and the durability will be degraded.

Therefore, an arrangement in which corrosion of a metal fastening member by the galvanic corrosion effect is prevented by laminating a plurality of CFRP prepregs in which an opening is formed in advance, disposing a GFRP (glass fiber-reinforced plastic) SMC (Sheet Molding Compound) formed into a tubular shape within the opening and curing it by applying pressure and heat in the interior of a mold, and covering the inner face of the opening of the CFRP laminate with a GFRP insert member to thus provide electrical insulation is known from Patent Document 1 below.

RELATED ART DOCUMENTS

Patent Documents

Patent Document 1: International Patent Application Laid-open No. WO2013/031360

SUMMARY OF THE INVENTION

Problems to be Solved by the Invention

However, since the arrangement described in Patent Document 1 above cannot avoid generating a step due to mutual displacement of the openings of the plurality of prepregs that are laminated, it is difficult to mold the insert member in the interior of the opening of the prepreg with uniform density, and there is a possibility that the metal fastening member retained by means of the insert member will wobble and the strength with which the component is fastened will be degraded.

Machining a through hole in the cured CFRP laminate afterwards and fitting a non-conductive insert member into the through hole could be considered, but there is a possibility that if frayed carbon fiber of the CFRP laminate, which has frayed when the through hole is machined, sticks out of a gap of the insert member, the CFRP laminate and the metal fastening member will become electrically continuous via the frayed carbon fiber.

The present invention has been accomplished in light of the above circumstances, and it is an object thereof to prevent frayed carbon fiber of a CFRP laminate from providing electrical continuity between the CFRP laminate and a metal fastening member.

Means for Solving the Problems

In order to attain the above object, according to a first aspect of the present invention, there is provided a fiber-reinforced resin member in which a through hole is machined in a CFRP laminate comprising a carbon fiber embedded in a resin, and a conductive metal fastening member is mounted in the through hole in an electrically insulated state, wherein the metal fastening member comprises a first member and a second member, the first member comprising a first flange portion extending along one surface of the CFRP laminate and a first bolt hole extending through the first flange portion, and the second member comprising a second flange portion extending along another surface of the CFRP laminate and a second bolt hole extending through the second flange portion, at least one of the first and second members comprising a collar portion that is inserted into the through hole and abuts against the other one of the first and second members and a third bolt hole that extends through the collar portion and is connected to the first and second bolt holes, an annular first non-conductive sheet encircling the through hole is held between the one surface of the CFRP laminate and the first flange portion, an annular second non-conductive sheet encircling the through hole is held between the another surface of the CFRP laminate and the second flange portion, and a non-conductive sleeve is disposed between an outer periphery of the collar portion and an inner periphery of the through hole, and a first annular space encircling an outer periphery of the non-conductive sleeve is formed between the first flange portion and the first non-conductive sheet, and a second annular space encircling the outer periphery of the non-conductive sleeve is formed between the second flange portion and the second non-conductive sheet.

Further, according to a second aspect of the present invention, in addition to the first aspect, the collar portion comprises a first collar portion of the first member and a second collar portion of the second member that interlock with each other.

Furthermore, according to a third aspect of the preset invention, in addition to the first or second aspect, a component is fixed to the metal fastening member by a bolt that extends through the first to third bolt holes and is screwed into a nut.

Moreover, according to a fourth aspect of the present invention, in addition to the first or second aspect, a component is fixed to the metal fastening member by a bolt screwed into a female thread formed in at least part of the first to third bolt holes.

Further, according to a fifth aspect of the present invention, in addition to any one of the first to fourth aspects, the first non-conductive sheet, the second non-conductive sheet, and the non-conductive sleeve have a film resistance of greater than $10^6$ $\Omega \cdot cm^2$.

Furthermore, according to a sixth aspect of the present invention, there is provided a method for producing the fiber-reinforced resin member in addition to any one of the first to fifth aspects, comprising a step of molding the CFRP laminate in a state in which the first and second non-conductive sheets are laminated on opposite faces of a prepreg comprising the carbon fiber, a step of machining the through hole extending through the CFRP laminate and the first and second non-conductive sheets, and a step of adhering the non-conductive sleeve and the first and second members so as to cover the through hole.

Effects of the Invention

In accordance with the first aspect of the present invention, when the metal fastening member formed from the first member and the second member is mounted in the through hole machined in the CFRP laminate, the non-conductive sleeve is disposed between the outer periphery of the collar portion of the first member or the second member and the inner periphery of the through hole of the CFRP laminate, the annular first non-conductive sheet encircling the through hole is held between the one surface of the CFRP laminate and the first flange portion of the first member, and the annular second non-conductive sheet encircling the through hole is held between the another surface of the CFRP laminate and the second flange portion of the second member, therefore, electrical continuity between the CFRP laminate and the metal fastening member is cut off by the non-conductive sleeve and the first and second non-conductive sheets, and corrosion of the metal fastening member due to galvanic corrosion can be prevented.

Since the first annular space encircling the outer periphery of the non-conductive sleeve is formed between the first flange portion of the first member and the first non-conductive sheet, and the second annular space encircling the outer periphery of the non-conductive sleeve is formed between the second flange portion of the second member and the second non-conductive sheet, even if frayed carbon fiber, which has frayed when machining a through hole in the CFRP laminate, sticks out from a gap between the non-conductive sleeve and the first and second non-conductive sheets, due to the first and second annular spaces being formed therein, it is possible to prevent the sticking-out carbon fiber from contacting the first and second members and providing electrical continuity.

Furthermore, in accordance with the second aspect of the present invention, since the collar portion is formed by interlocking the first collar portion of the first member and the second collar portion of the second member with each other, it is possible to integrate the first member and the second member by the collar portion, thus enhancing the strength with which a component is fastened.

Moreover, in accordance with the third aspect of the present invention, since the component is fixed to the metal fastening member by the bolt that extends through the first to third bolt holes and is screwed into the nut, it is possible to simply and strongly fasten the component to the CFRP laminate.

Furthermore, in accordance with the fourth aspect of the present invention, since the component is fixed to the metal fastening member by the bolt screwed into the female thread formed in at least part of the first to third bolt holes, not only is it possible to simply and strongly fasten the component to the CFRP laminate, but the number of components is cut due to a nut being unnecessary.

Moreover, in accordance with the fifth aspect of the present invention, since the first non-conductive sheet, the second non-conductive sheet, and the non-conductive sleeve have a film resistance of greater than $10^6$ $\Omega \cdot cm^2$, it is possible to reliably cut off electrical continuity between the metal fastening member and the CFRP laminate, thus preventing the occurrence of galvanic corrosion.

Furthermore, in accordance with the sixth aspect of the present invention, since the CFRP laminate is molded in a state in which the first and second non-conductive sheets are laminated on opposite faces of the prepreg containing the carbon fiber, the through hole is machined so as to extend through the CFRP laminate and the first and second non-conductive sheets, and the non-conductive sleeve and the first and second members are adhered so as to cover the through hole, electrical continuity between the CFRP laminate and the metal fastening member is cut off by the non-conductive sleeve and the first and second non-conductive sheets, and not only is corrosion of the metal fastening member due to galvanic corrosion prevented, but the productivity of the fiber-reinforced resin member is also improved since it is unnecessary to mold the non-conductive sleeve in the interior of the through hole and it may simply be adhered to the through hole after molding the CFRP laminate.

EXPLANATION OF REFERENCE NUMERALS AND SYMBOLS

12 CFRP laminate
13A first non-conductive sheet
13B second non-conductive sheet
14 through hole
15 non-conductive sleeve
16 metal fastening member
17 component
18 bolt
19 nut
20 first member
20a first collar portion (collar portion)
20b first flange portion
20c first bolt hole
20d third bolt hole
20f female thread
21 second member
21a second flange portion
21b second bolt hole
21d second collar portion (collar portion)
22 prepreg
24 carbon fiber
α first annular space
β second annular space

MODES FOR CARRYING OUT THE INVENTION

Embodiments of the present invention are explained below by reference to the attached drawings.

First Embodiment

A first embodiment of the present invention is now explained by reference to FIG. 1 to FIG. 3.

Figure 1:
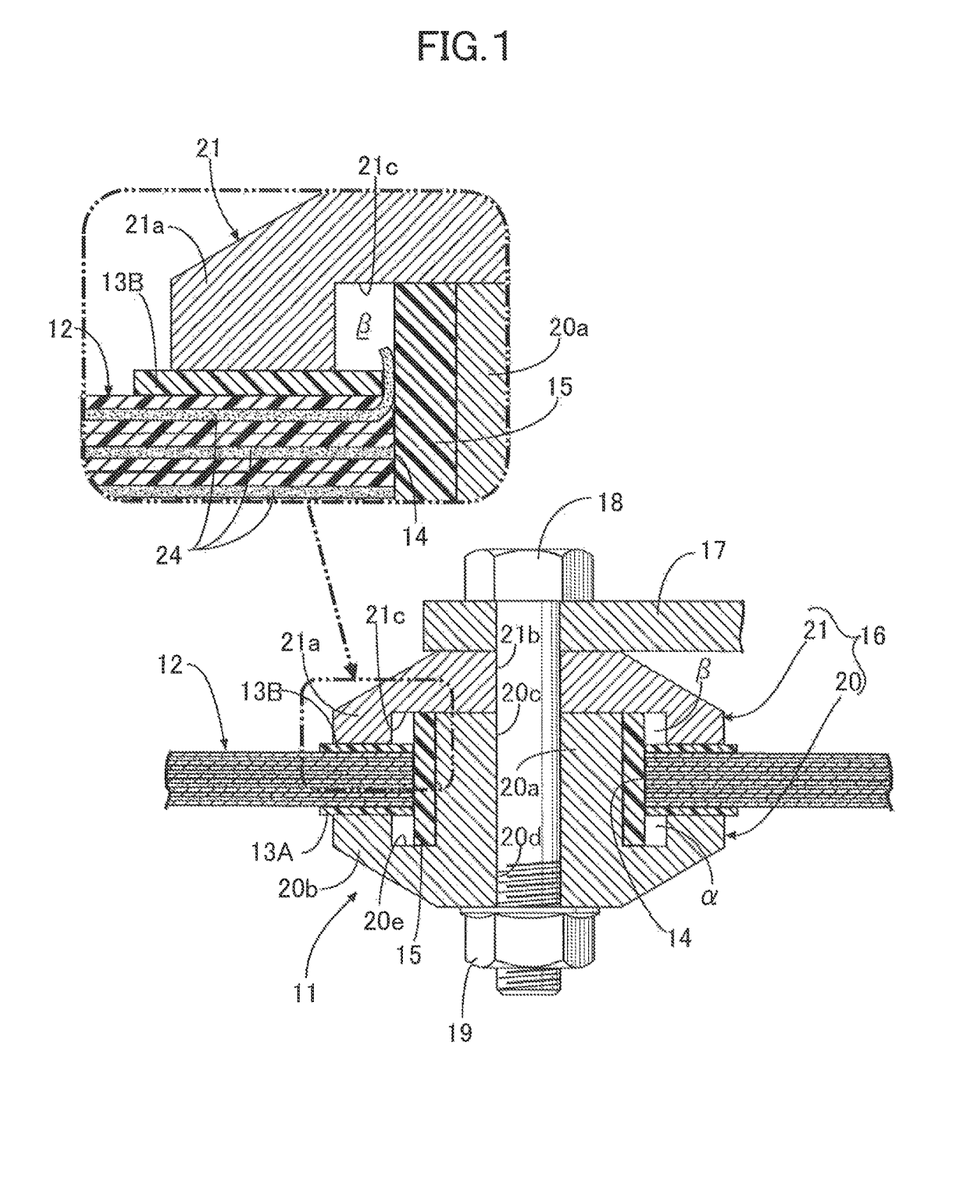
FIG. 1 is a sectional view of a fiber-reinforced resin member. (first embodiment)
Figure 2:
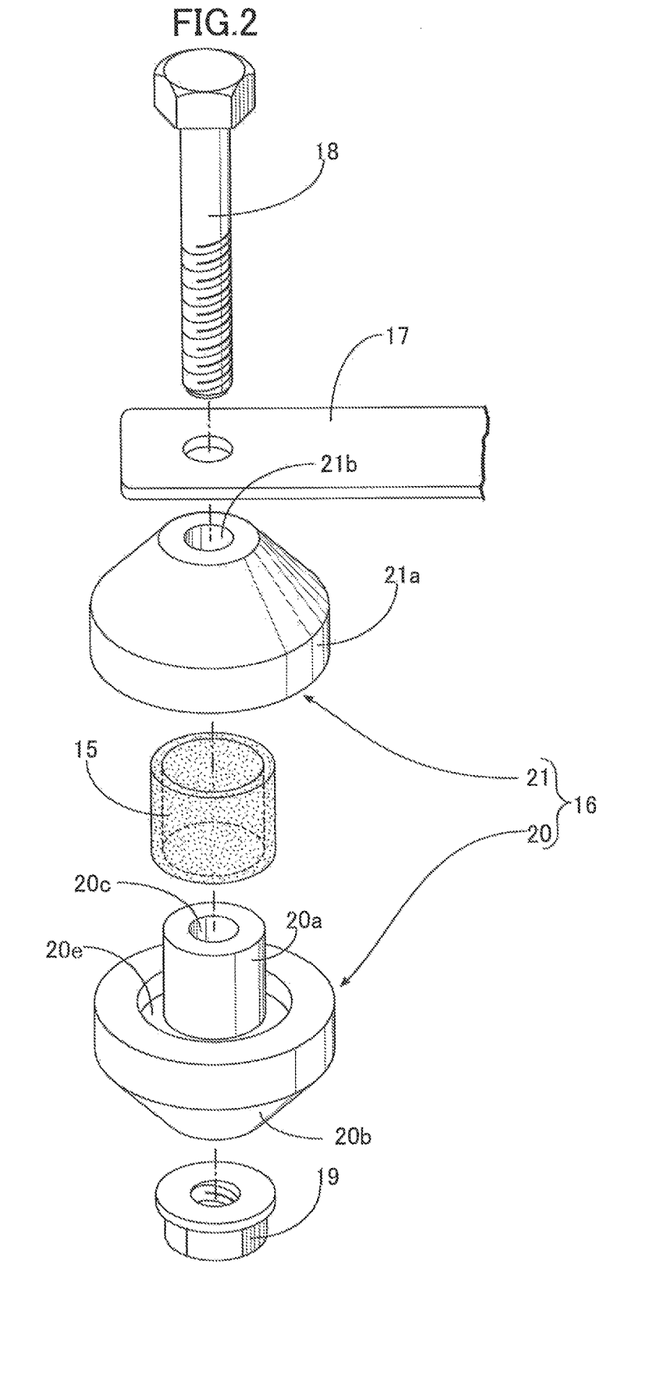
FIG. 2 is an exploded perspective view of the fiber-reinforced resin member. (first embodiment)

As shown in FIG. 1 and FIG. 2, a fiber-reinforced resin member 11 such as for example a subframe of an automobile is formed from a CFRP laminate 12, first and second non-conductive sheets 13A and 13B formed from a GFRP circular sheet laminated on opposite faces of the CFRP laminate, a through hole 14 having a circular cross section and extending through the CFRP laminate 12 and the first and second non-conductive sheets 13A and 13B, a GFRP cylindrical non-conductive sleeve 15 fitted into the through hole 14, and a metal fastening member 16 fitted so as to be in contact with the first and second non-conductive sheets 13A and 13B and the non-conductive sleeve 15.

Extending a bolt 18, which extends through a component 17 such as for example a suspension member, through the metal fastening member 16 and screwing it into a nut 19 simply and strongly fastens the component 17 to the metal fastening member 16.

The CFRP laminate 12, which is conductive, is formed by laminating a plurality of carbon fiber prepregs, shaping them into a predetermined shape within a mold, and curing. The prepreg is formed by impregnating a carbon fiber nonwoven cloth or UD (sheet in which fibers are aligned in one direction) with a semi-cured thermosetting resin (epoxy resin or polyester resin), and has a pliability that enables it to conform to the shape of the mold. The CFRP laminate 12 is obtained by inserting the prepreg in a laminated state into the mold and heating it to for example about 130° C. while applying pressure, to thus cure the thermosetting resin.

The first and second non-conductive sheets 13A and 13B, which are made of a non-conductive GFRP, are cured by heating at the same time as the CFRP laminate 12 within the same mold in a state in which the glass fiber prepregs which have been cut into a circular shape in advance are laminated on opposite faces of the CFRP laminate 12 prepreg.

The metal fastening member 16, which is formed from a conductive metal such as an aluminum alloy, is formed from a first member 20 and a second member 21. The first member 20 includes a tubular first collar portion 20a and a first flange portion 20b extending radially outwardly from one end of the first collar portion 20a, and the first collar portion 20a and the first flange portion 20b have extending therethrough respectively a first bolt hole 20c and a third bolt hole 20d extending on an axis L. A first annular groove 20e encircling the axis L is formed in an inner face (face on the second member 21 side) of the first flange portion 20b.

On the other hand, the second member 21 is a member that includes only a second flange portion 21a, which corresponds to one formed by deleting the first collar portion 20a from the first member 20; a second bolt hole 21b extending on the axis L extends through the second flange portion 21a, and a second annular groove 21c encircling the axis L is formed in an inner face (face on the first member 20 side) of the second flange portion 21a.

In a state in which the metal fastening member 16 is mounted on the CFRP laminate 12, the non-conductive sleeve 15 is fitted between the outer periphery of the first collar portion 20a of the first member 20 and the inner periphery of the through hole 14 of the CFRP laminate 12 and the first and second non-conductive sheets 13A and 13B, the first collar portion 20a of the first member 20 is fitted into the interior of the non-conductive sleeve 15, and the first flange portion 20b of the first member 20 abuts against the first non-conductive sheet 13A. With regard to the second member 21, a radially inner portion of the second flange portion 21a abuts against the extremity of the first collar portion 20a of the first member 20, and a radially outer portion of the second flange portion 21a abuts against the second non-conductive sheet 13B.

Screwing the bolt 18 extending through the component 17, the second bolt hole 21b of the second member 21, and the first and third bolt holes 20c and 20d of the first member 20 into the nut 19 fastens the component 17 to the metal fastening member 16.

The film resistance of the first non-conductive sheet 13A, the second non-conductive sheet 13B, and the non-conductive sleeve 15 is set to a value that is greater than $10^6$ Ω·cm$^2$.

A production process for the fiber-reinforced resin member 11 having the above arrangement is now explained by reference to FIG. 3.

Figure 3:
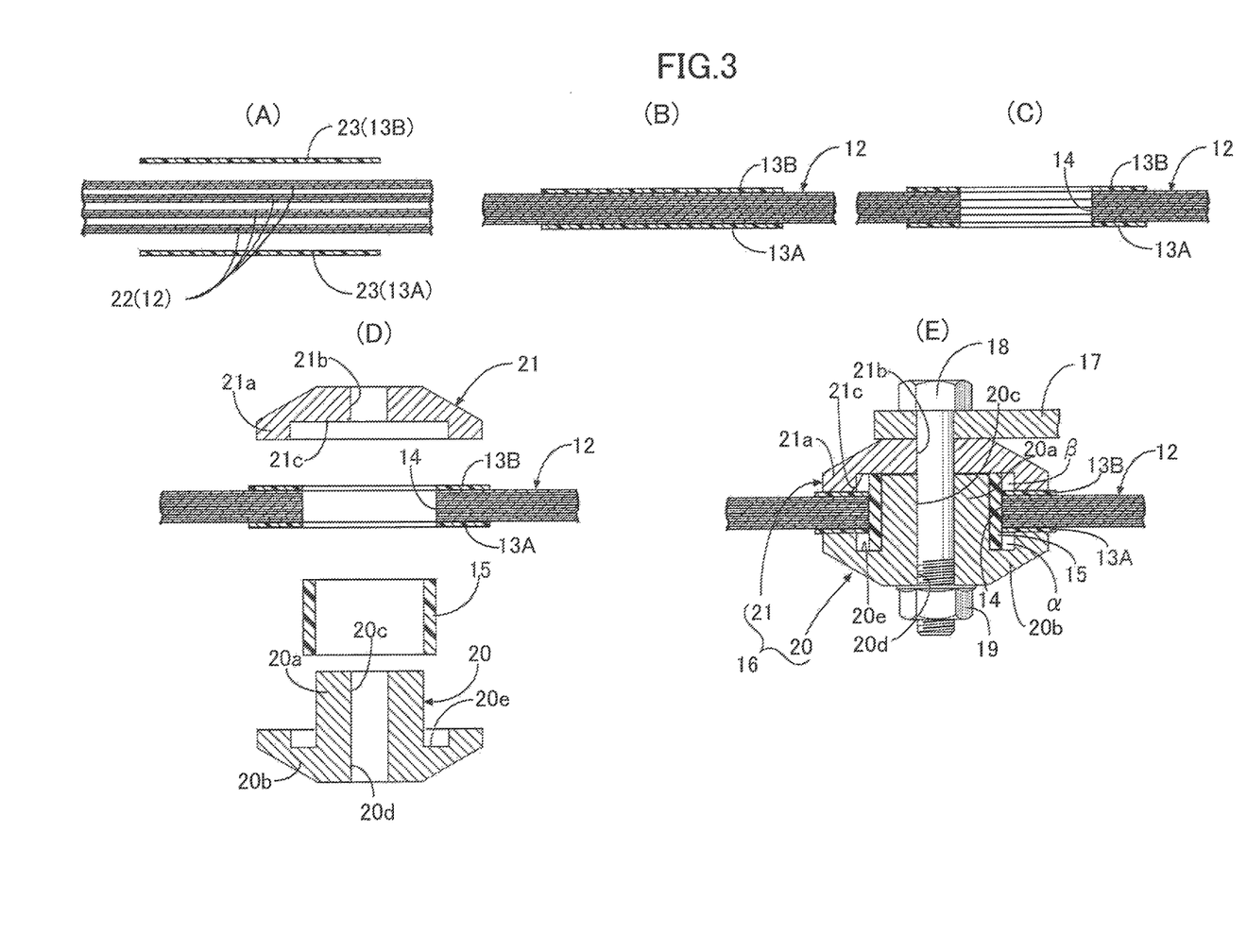
FIG. 3 is a view showing a production process for the fiber-reinforced resin member. (first embodiment)

First, a plurality of carbon fiber prepregs 22 as a material for the CFRP laminate 12 are laminated, two layers of glass fiber prepregs 23 and 23 are laminated on opposite faces of the above (see FIG. 3 (A)), the two layers of prepregs 23 and 23 being a material for the first non-conductive sheet 13A and the second non-conductive sheet 13B and being cut into a circular shape, and pressure and heat are applied to the above within a mold to thus give a predetermined shape and carry out curing, thereby molding the CFRP laminate 12 having the first non-conductive sheet 13A and the second non-conductive sheet 13B laminated on opposite faces (see FIG. 3 (B)).

Next, the through hole 14 passing through the centers of the first non-conductive sheet 13A and the second non-conductive sheet 13B and extending through the CFRP laminate 12 is formed by machining such as for example drilling (see FIG. 3 (C)).

Next, the non-conductive sleeve 15 is inserted into the through hole 14, the first collar portion 20a of the first member 20 is inserted into the non-conductive sleeve 15 from one side face of the CFRP laminate 12, and the second flange portion 21a of the second member 21 is made to abut against the extremity of the first collar portion 20a of the first member 20 from the other side face of the CFRP laminate 12, thereby holding the CFRP laminate 12 between the first member 20 and the second member 21 (see FIG. 3 (D)).

Next, screwing the bolt 18 extending through the component 17, the second member 21, and the first member 20 into the nut 19 fastens the component 17 to the metal fastening member 16 (see FIG. 3 (E)).

The operation of the embodiment of the present invention having the above arrangement is now explained.

When a load transmitted from the component 17 is inputted into the CFRP laminate 12 of the fiber-reinforced resin member 11 via the bolt 18, dispersing the load over a wide area of the CFRP laminate 12 by means of the metal fastening member 16 stops stress from being concentrated, thus preventing local breakage of the CFRP laminate 12 and enhancing the strength with which the component 17 is mounted. In this process, since the glass fibers contained in the first and second GFRP non-conductive sheets 13A and 13B abutting against the first flange portion 20b of the first member 20 and the second flange portion 21a of the second member 21 have excellent stretchability compared with the carbon fibers contained in the CFRP laminate 12, when the load is applied to the metal fastening member 16 it is possible to alleviate stress concentrating in an area around the through hole 14 by means of the first and second non-conductive sheets 13A and 13B.

Moreover, it is not necessary to mold the non-conductive sleeve 15 in the interior of the through hole 14, and it may be adhered to the through hole 14 only after molding the CLRP laminate 12, thus improving the productivity of the fiber-reinforced resin member 11.

Incidentally, the CFRP laminate 12 of the fiber-reinforced resin member 11 is a conductive member containing carbon fibers, and if the conductive metal fastening member 16 is in direct contact therewith, there is a possibility that galvanic corrosion will occur in the metal fastening member 16. However, in accordance with the present embodiment, since the non-conductive sleeve 15 is present between the first collar portion 20a of the metal fastening member 16 and the through hole 14 of the CFRP laminate 12, and the first non-conductive sheet 13A and the second non-conductive sheet 13B are present between the first flange portion 20b and second flange portion 21a of the metal fastening member 16 and opposite faces of the CFRP laminate 12, it is possible to prevent galvanic corrosion from occurring by electrically insulating the CFRP laminate 12 from the metal fastening member 16.

In this process, since the film resistance of the first non-conductive sheet 13A, the second non-conductive sheet 13B, and the non-conductive sleeve 15 is set to a value that is greater than $10^6$ $\Omega \cdot cm^2$, electrical continuity between the metal fastening member 16 and the CLRP laminate 12 can reliably be blocked, thus making it possible to more reliably prevent galvanic corrosion from occurring.

Furthermore, when the through hole 14 is drilled in the CFRP laminate 12, if the carbon fiber 24 contained in the CLRP laminate 12 (see enlarged part of FIG. 1) becomes frayed and sticks out from the resin, there is a possibility that this carbon fiber 24 will pass through a gap between the non-conductive sleeve 15 and the first and second non-conductive sheets 13A and 13B, contact the metal fastening member 16, and cause galvanic corrosion. However, in accordance with the present embodiment, since a first annular space a facing the gap between the non-conductive sleeve 15 and the first non-conductive sheet 13A is formed by means of the first annular groove 20e formed in the first member 20, the carbon fiber 24 passing through the gap between the non-conductive sleeve 15 and the first non-conductive sheet 13A and sticking into the first annular space α cannot contact the metal fastening member 16, and galvanic corrosion of the metal fastening member 16 can be prevented.

Similarly, since a second annular space β facing the gap between the non-conductive sleeve 15 and the second non-conductive sheet 13B is formed by means of the second annular groove 21c formed in the second member 21, the carbon fiber 24 passing through the gap between the non-conductive sleeve 15 and the second non-conductive sheet 13B and sticking into the second annular space β cannot contact the metal fastening member 16, and galvanic corrosion of the metal fastening member 16 can be prevented.
Second Embodiment A second embodiment of the present invention is now explained by reference to FIG. 4.

Figure 4:
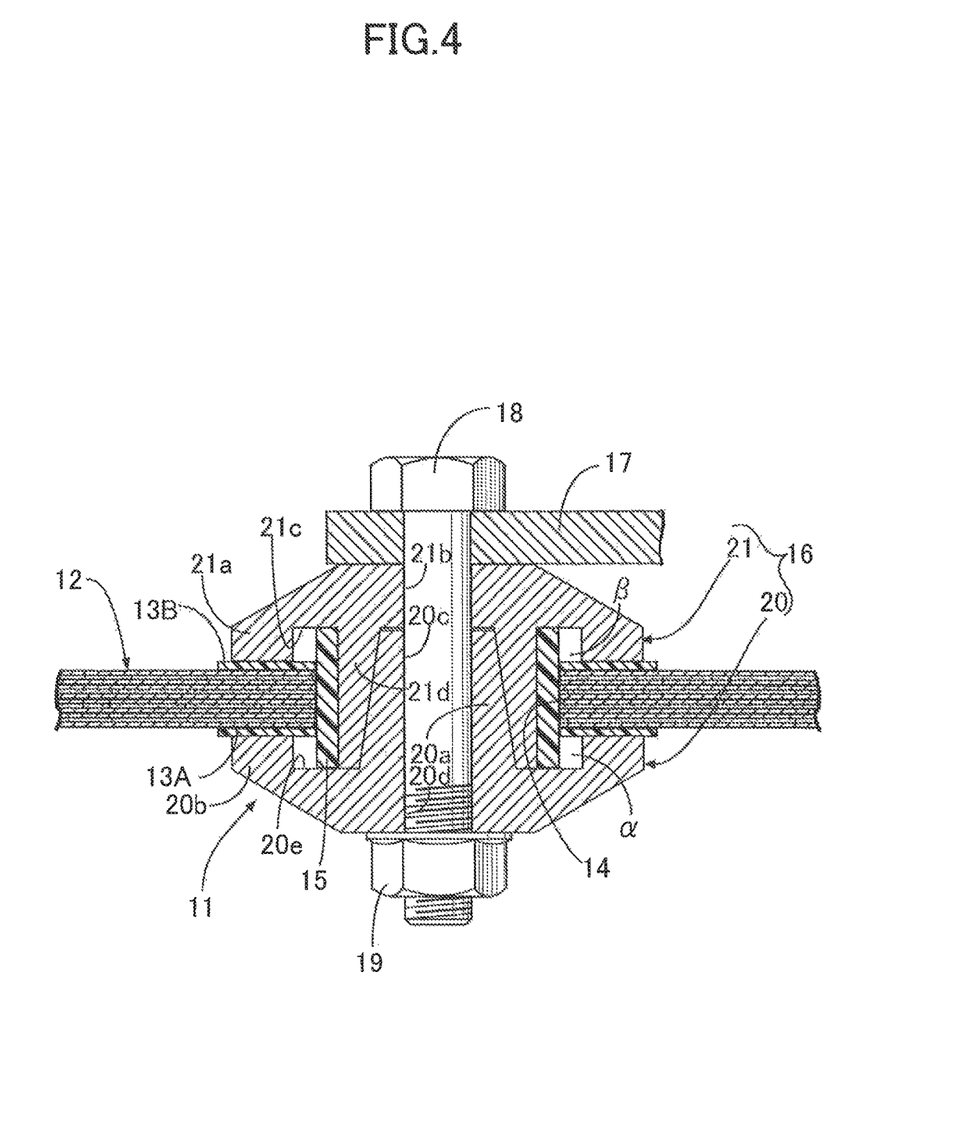
FIG. 4 is a view corresponding to FIG. 1. (second embodiment)

In the first embodiment, since the extremity of the first collar portion 20a of the first member 20 abuts against the second flange portion 21a of the second member 21, the first member 20 and the second member 21 are not positioned with respect to each other and are indirectly positioned by means of the bolt 18 extending through the first member 20 and the second member 21; in the second embodiment, a tapered face of the outer periphery of the first collar portion 20a of the first member 20 and a tapered face of the inner periphery of a second collar portion 21d of the second member 21 interlock with each other, and the first member 20 and the second member 21 are directly positioned with respect to each other.

This enables the first member 20 and the second member 21 to be strongly integrated, thus enhancing the strength with which the component 17 is fastened to the metal fastening member 16.
Third Embodiment A third embodiment of the present invention is now explained by reference to FIG. 5.

Figure 5:
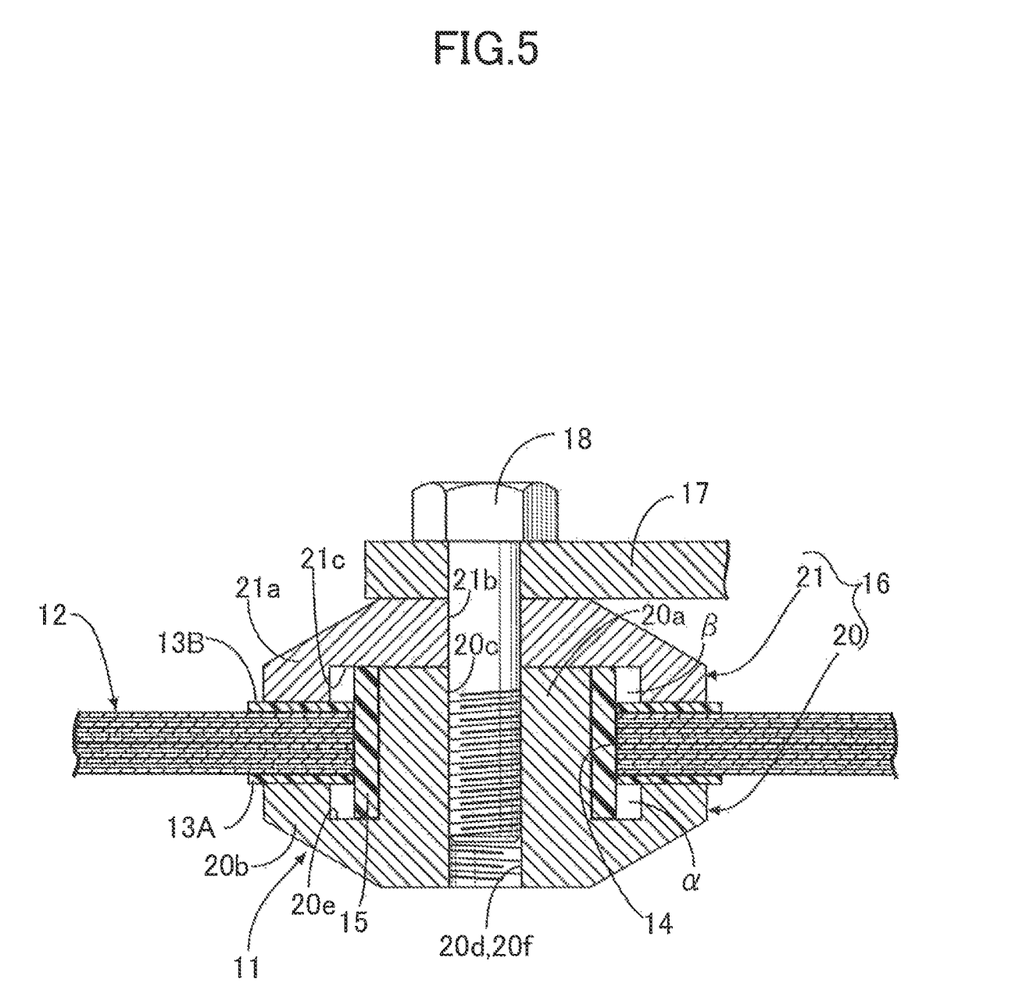
FIG. 5 is a view corresponding to FIG. 1. (third embodiment)

In the first embodiment, the component 17 is fastened to the metal fastening member 16 by means of the bolt 18 and the nut 19, but in the third embodiment a female thread 20f is formed in inner faces of the first bolt hole 20c and the third bolt hole 20d of the first member 20, and the bolt 18 is directly screwed into the female thread 20f.

This makes the nut 19 unnecessary and enables the number of components and the weight to be reduced.

Embodiments of the present invention are explained above, but the present invention may be modified in a variety of ways as long as the modifications do not depart from the spirit and scope thereof.

For example, the fiber-reinforced resin member 11 of the present invention may be applied to any application other than an automobile subframe.

In the embodiment, the non-conductive sleeve 15, the first non-conductive sheet 13A, and the second non-conductive sheet 13B are made of a GFRP, which is non-conductive, but any material other than a GFRP may be selected as long as it is non-conductive.

The invention claimed is:

1. A fiber-reinforced resin member in which a through hole is machined in a carbon fiber-reinforced plastic (CFRP) laminate comprising a carbon fiber embedded in a resin, and a conductive metal fastening member is mounted in the through hole in an electrically insulated state,
   wherein the metal fastening member comprises a first member and a second member, the first member comprising a first flange portion extending along one surface of the CFRP laminate and a first bolt hole extending through the first flange portion, and the second member comprising a second flange portion extending along another surface of the CFRP laminate and a second bolt hole extending through the second flange portion, at least one of the first and second members comprising a collar portion that is inserted into the through hole and abuts against the other one of the first and second members and a third bolt hole that extends through the collar portion and is connected to the first and second bolt holes,
   an annular first non-conductive sheet encircling the through hole is held between said one surface of the CFRP laminate and the first flange portion, an annular second non-conductive sheet encircling the through hole is held between the another surface of the CFRP laminate and the second flange portion, and a non-conductive sleeve is disposed between an outer periphery of the collar portion and an inner periphery of the through hole, and
   a first annular space encircling an outer periphery of the non-conductive sleeve is formed between the first flange portion and the first non-conductive sheet, and a second annular space encircling the outer periphery of the non-conductive sleeve is formed between the second flange portion and the second non-conductive sheet.

2. The fiber-reinforced resin member according to claim 1, wherein the collar portion comprises a first collar portion of the first member and a second collar portion of the second member that interlock with each other.

3. The fiber-reinforced resin member according to claim 2, wherein a component is fixed to the metal fastening member by a bolt that extends through the first to third bolt holes and is screwed into a nut.

4. The fiber-reinforced resin member according to claim 2, wherein a component is fixed to the metal fastening member by a bolt screwed into a female thread formed in at least part of the first to third bolt holes.

5. The fiber-reinforced resin member according to claim 2, wherein the first non-conductive sheet, the second non-conductive sheet, and the non-conductive sleeve have a film resistance of greater than $10^6$ $\Omega \cdot cm^2$.

6. The fiber-reinforced resin member according to claim 1, wherein a component is fixed to the metal fastening member by a bolt that extends through the first to third bolt holes and is screwed into a nut.

7. The fiber-reinforced resin member according to claim 1, wherein a component is fixed to the metal fastening member by a bolt screwed into a female thread formed in at least part of the first to third bolt holes.

8. The fiber-reinforced resin member according to claim 1, wherein the first non-conductive sheet, the second non-conductive sheet, and the non-conductive sleeve have a film resistance of greater than $10^6$ $\Omega \cdot cm^2$.

9. A method for producing the fiber-reinforced resin member according to claim 1, the method comprising
  a step of molding the CFRP laminate in a state in which the first and second non-conductive sheets are laminated on opposite faces of a prepreg comprising the carbon fiber,
  a step of machining the through hole extending through the CFRP laminate and the first and second non-conductive sheets, and
  a step of adhering the non-conductive sleeve and the first and second members so as to cover the through hole.

10. A method for producing the fiber-reinforced resin member according to claim 2, the method comprising
  a step of molding the CFRP laminate in a state in which the first and second non-conductive sheets are laminated on opposite faces of a prepreg comprising the carbon fiber,
  a step of machining the through hole extending through the CFRP laminate and the first and second non-conductive sheets, and
  a step of adhering the non-conductive sleeve and the first and second members so as to cover the through hole.

* * * * *